US008598394B2

(12) United States Patent
Goze et al.

(10) Patent No.: US 8,598,394 B2
(45) Date of Patent: Dec. 3, 2013

(54) MANUFACTURE OF LOW VISCOSITY POLY ALPHA-OLEFINS

(75) Inventors: Maria Caridad Brillantes Goze, East Brunswick, NJ (US); Phil Surana, Somerset, NJ (US); Norman Yang, Westfield, NJ (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 805 days.

(21) Appl. No.: 12/164,824

(22) Filed: Jun. 30, 2008

(65) Prior Publication Data

US 2009/0326296 A1 Dec. 31, 2009

(51) Int. Cl.
*C07C 2/08* (2006.01)

(52) U.S. Cl.
USPC ........... 585/255; 585/254; 585/264; 585/510; 585/520; 585/521; 585/525

(58) Field of Classification Search
USPC ......... 585/520, 525, 532, 254, 255, 264, 510, 585/521
See application file for complete search history.

(56) References Cited

U.S. PATENT DOCUMENTS

| | | | | |
|---|---|---|---|---|
| 3,149,178 A | * | 9/1964 | Hamilton et al. | 585/18 |
| 3,780,128 A | * | 12/1973 | Shubkin | 585/12 |
| 3,907,924 A | * | 9/1975 | Isa et al. | 585/255 |
| 4,045,507 A | * | 8/1977 | Cupples et al. | 585/511 |
| 4,172,855 A | * | 10/1979 | Shubkin et al. | 585/16 |
| 6,824,671 B2 | | 11/2004 | Goze | |
| 6,949,688 B2 | * | 9/2005 | Goze et al. | 585/525 |
| 2003/0166986 A1 | | 9/2003 | Clarembeau | |
| 2007/0225535 A1 | | 9/2007 | Yang et al. | |

FOREIGN PATENT DOCUMENTS

| | | | | |
|---|---|---|---|---|
| JP | 06-199708 | * | 7/1994 | C07C 11/02 |
| JP | 3348893 | | 11/2002 | |
| WO | 2002/092729 | | 11/2002 | |
| WO | 2006/101585 | | 9/2006 | |

OTHER PUBLICATIONS

D.R. Lide, ed., CRC Handbook of Chemistry and Physics, 91st edition, 2011 Internet Version, available on-line at http://www.hbcpnetbase.com/.*
Machine translation of Akatsu, et al. (JP 06-199708), accessed Aug. 17, 2013.*

* cited by examiner

*Primary Examiner* — In Suk Bullock
*Assistant Examiner* — Bradley Etherton
(74) *Attorney, Agent, or Firm* — Nancy T. Krawczyk; Leandro Arechederra, III

(57) ABSTRACT

The present invention relates to poly alpha-olefins (PAO's) which exhibit superior Noack volatility at low pour points. The poly alpha-olefin is prepared from an olefin feed comprised of a blend of octene, decene, and dodecene, the feed comprising at least 10 weight % octene and at least 30 weight % dodecene. The process includes both synthesis and distillation of the olefin and oligomerization olefin. The oligomerized olefin feed yields at least 50% low viscosity PAO having a nominal viscosity at 100° C. of about 4 cSt.

9 Claims, No Drawings

MANUFACTURE OF LOW VISCOSITY POLY ALPHA-OLEFINS

FIELD OF THE INVENTION

This invention relates to the manufacture of low viscosity poly alpha-olefins. More particularly, this invention relates to certain low viscosity poly alpha-olefins prepared from a mixed feed of olefins and the method of manufacture of such oligomers.

BACKGROUND OF THE INVENTION

Poly alpha-olefins comprise one class of hydrocarbon lubricants which has achieved importance in the lubricating oil market. These materials are typically produced by the polymerization of alpha-olefins typically ranging from 1-octene to 1-dodecene, with 1-decene being a preferred material, although polymers of lower olefins such as ethylene and propylene may also be used, including copolymers of ethylene with higher olefins. The poly alpha-olefin (PAO) products may be obtained with a wide range of viscosities varying from highly mobile fluids of about 2 cSt at 100° C. to higher molecular weight, viscous materials which have viscosities exceeding 100 cSt at 100° C. The PAO's may be produced by the polymerization of olefin feed in the presence of a catalyst such as $AlCl_3$, $BF_3$, or $BF_3$ complexes. Subsequent to the polymerization, the lubricant range products may be hydrogenated in order to reduce the residual unsaturation. In the course of this reaction, the amount of unsaturation is generally reduced by greater than 90%.

The automotive industry is placing greater demands on engine oils—operating at higher temperatures for longer times; driving a demand for low viscosity PAO's, preferably 4 cSt, while desiring Noack volatility and low temperature performance properties. Thus, a need exists for low viscosity PAO's which exhibit low Noack volatility (ASTM D 5800 Standard Test Method for Evaporation Loss of Lubricating Oils by the Noack Method).

The properties of a particular grade of PAO are greatly dependent on the alpha-olefin used to make that product. In general, the higher the carbon number of the alpha-olefin, the lower the Noack volatility and the higher the pour point of the product. Conversely, the lower the carbon number of the alpha-olefin, the higher the Noack volatility and the lower the pour point of the product. For either olefin used, for automotive applications, the desired low Noack volatility and the lower pour point are generally conflicting goals for a PAO.

PAO's having a viscosity of 4 cSt are typically made from 1-decene and have a Noack volatility of 13-14% and pour point of <-60° C. PAO's having a viscosity of 6 cSt are typically prepared from 1-decene or a blend of alpha-olefins and have a Noack volatility of about 7.0% and pour point of about -60° C.

SUMMARY OF THE INVENTION

Disclosed herein is a process for the oligomerization of alpha-olefins. The feedstock is a blend of at least 10 weight % octene, decene, and at least 30 weight % dodecene. The alpha-olefin feedstock and at least one catalyst are subjected to oligomerization conditions in a reactor. Following reaction, the mixture is subjected to distillations to removed unreacted alpha-olefins and dimers of the alpha-olefins. The resulting product may be hydrogenated. The final product contains at least two fractions of polyalpha-olefins of differing nominal viscosities.

In various embodiments, the feedstock may have the following aspects. The feedstock may contain at least 25% decene. The feedstock may contain not more than about 50% decene. The feedstock may contain not more than about 35% octene. The feedstock may contain not more than about 45% dodecene. The feedstock may contain not more than about 35% decene. The feedstock may contain not more than about 35% octene, not more than 45% dodecene, and at least 25% but not more than 60% decene. In yet another aspect of any of the disclosed embodiments, the weight percentages of the octene, decene, and dodecene in the feed yields an average carbon content in the range of 9.9 to 10.5.

In one embodiment, the disclosed last distillation of the reacted mixtures results in a fraction of polyalpha-olefin having a 100° C. viscosity of about 4 cSt and a fraction having a 100° C. viscosity of about 6 cSt, the fraction of about 4 cSt viscosity at 100° C. being at least 50% of the yield.

Another aspect of any of the disclosed embodiments is that the resulting polyalpha-olefin having a viscosity of about 4 cSt at 100° C. has a pour point of about -45° C. to -80° C.; the pour point being determined by ASTM D5950.

Another aspect of any of the disclosed embodiment is that the resulting polyalpha-olefin having a viscosity of about 6 cSt at 100° C. has a pour point of about -45° C. to -75° C.; the pour point being determined by ASTM D5950.

Also disclosed herein is a polyalpha-olefin that is an oligomerized alpha-olefin which has been subjected to hydrogenation. The oligomerized alpha-olefin is prepared by a) contacting an olefin feed comprised of a blend of at least 10 weight % octene, decene, and at least 30 weight % dodecene to obtain an intermediate product comprising olefin trimers, and b) distilling the intermediate product. The oligomerized alpha-olefin has a 100° C. viscosity of about 4 cSt, and a pour point of about -45° C. to -80° C. as determined by ASTM D5950.

Also disclosed herein is a polyalpha-olefin that is an oligomerized alpha-olefin which has been subjected to hydrogenation. The oligomerized alpha-olefin is prepared by a) contacting an olefin feed comprised of a blend of at least 10 weight % octene, decene, and at least 30 weight % dodecene to obtain an intermediate product comprising olefin trimers, and b) distilling the intermediate product. The oligomerized alpha-olefin has a 100° C. viscosity of about 6 cSt, and a pour point of about -45° C. to -75° C. as determined by ASTM D5950.

In another aspect, applicable to any of the disclosed polyalpha-olefins, the polyalpha-olefin may be further blended with at least one additional API Group I to Group V basestock.

DETAILED DESCRIPTION OF THE INVENTION

Various specific embodiments, versions, and examples of the invention will now be described, including preferred embodiments and definitions that are adopted herein for purposes of understanding the claimed invention. This description is made for the purpose of illustrating the general principles of the invention and should not be taken in a limiting sense. The scope of the invention is best determined by reference to the appended claims.

Poly alpha-olefins (PAO's) are prepared by the process of polymerizing a feedstock of linear alpha olefins in the presence of a catalyst and at least one cocatalyst. The oligomerized product, or a portion of the oligomerized product, may then be hydrogenated to change the saturation level of the PAO. Further processing of the oligomerized product or the hydrogenated product may be done to achieve the desired PAO.

The feedstock of liner alpha-olefins is comprised of a blend of octene, decene, and dodecene. Preferably, the feedstock is a blend of 1-octene, 1-decene, and 1-dodecene. The amount of octene in the feedstock is at least 10 weight percent, may be greater than 10 weight %, may be at least 20 weight % in one embodiment, and at least 30 weight % in another embodiment. Additionally, the amount of octene in the feedstock is not more than about 35 weight % in another embodiment. The amount of decene in the feedstock is at least 25 weight %, and may be at least 30 weight % in one embodiment. Additionally, the amount of decene in the feedstock may be approximately 40, 45, or 50 weight % in other embodiments. The amount of decene is not greater than about 60 weight %. The amount of dodecene in the feedstock is at least 30 weight %, and may be not more than 40 weight % in one embodiment, and not more than about 45 weight % in yet another embodiment.

Suitable catalysts for oligomerization include $BF_3$, and the oligomerization catalyst is preferably used with a combination of cocatalysts. A combination of cocatalysts has been determined to produce oligomers having more desired physical properties and product distributions. The combination of cocatalysts includes one alcohol and at least one alkyl acetate. Suitable alcohols include $C_1$-$C_{10}$ alcohols, preferably $C_1$-$C_6$ alcohols, and include methanol, ethanol, n-propanol, n-butanol, n-pentanol, and n-hexanol. Suitable acetates include $C_1$-$C_{10}$ alkyl acetates, preferably $C_1$-$C_6$ alkyl acetates including methyl acetate, ethyl acetate, n-propyl acetate, n-butyl acetate, and the like. The cocatalysts complex with the principal catalyst to form a coordination compound which is catalytically active. The cocatalyst is used in an amount of from about 0.01 to about 10 weight percent, based on the weight of the α-olefin feed, most preferably about 0.1 to 6 weight percent.

The catalyst is introduced into the reactor simultaneously with any cocatalysts and the olefin feed. It is preferred that the reaction zone contain an excess of catalyst, which is governed by the pressure and partial pressure of the catalyst. In this regard, the catalyst is maintained in the reaction zone at a pressure of about 2 to about 500 psig, preferably about 2 to 50 psig. Alternatively, the boron trifluoride can be sparged into the reaction mixture, along with other known methods for introducing the catalyst to the reaction zone.

Suitable temperatures for the reaction are also conventional and can vary from about −20° C. to about 90° C., with a range of about 15° to 70° C. being preferred.

The oligomerization reaction may be conducted either by semi-batch mode in a single stirred tank reactor or by continuous operation in a series of stirred tank reactors. Following oligomerization of the feed, the mixture is distilled in a first distillation step to remove any unreacted monomers and some dimers. The feed is then subject to a second distillation to remove remaining dimers. The resulting bottoms intermediate is then hydrogenated to saturate the remaining trimers and higher oligomers. This hydrogenation product is then distilled in a third distillation step. The bottoms product will have a viscosity higher than the overhead product. With the mixed feed stock discussed above, the preferred overhead product has a nominal viscosity of about 4 cSt at 100° C. The overhead product may also be combined with product from the second distillation step if an adjustment to the viscosity is required. The overhead product will have a greater fraction of trimers than the bottoms product.

From the mixed feed stream, using the synthesis-distillation process, the bottom and overhead product split yield both a PAO having a nominal viscosity at 100° C. of 4 cSt and a PAO having a nominal viscosity at 100° C. of 6 cSt. Further references to the different PAOs shall be shorthanded to their nominal viscosity value at 100° C. In one embodiment, the yield is at least 45% of 4 cSt PAO and not greater than 55% of 6 cSt PAO. In another embodiment, the yield is an approximately equal amount of both PAOs. In yet another embodiment, the yield of 4 cSt PAO is greater than the 6 cSt PAO.

The products of this process possess a good balance of properties, especially low Noack volatility and pour point. The Noack volatility of the 4 cSt PAO is in the range of about 10 to 15% weight loss, alternatively 11 to 14% weight loss, as determined by a modified ASTM D5800 method. The 4 cSt PAO has a pour point of about −45° C. to −80° C., alternatively −60° to −70° C., as determined by ASTM D5950. The Noack volatility of the 6 cSt PAO is in the range of about 4 to 12% weight loss, alternatively 5 to 8% weight loss, as determined by a modified ASTM D5800 method. The 6 cSt PAO has a pour point of about −45° C. to −75° C., alternatively −50° to −70° C., as determined by ASTM D5950. The modified ASTM D5800 method is an ASTM D5800 method with the exception that thermometer calibration is performed annually, rather than biannually.

The hydrogenation of the oligomerized α-olefin may be accomplished using conventional hydrogenation methodology to reduce at least a portion of the residual unsaturation which remains after the oligomerization. In this regard, typical hydrogenation catalysts such as Pd, Pt, Ni, etc., can be utilized. In the hydrogenation step, it is preferred that at least about 90% of the residual unsaturation be reduced.

EXAMPLES

A reference and examples of PAOs were prepared using different feedstock blends. Unless otherwise indicated, all examples were prepared by the following method. The feedstock was oligomerized in two continuous stirred-tank reactors in series at 22° C. and 5 psig using $BF_3$ and $BF_3$ promoted butanol-butyl acetate mixture. The mole ratio of butanol to butyl acetate was 3 to 1. Residence times in the primary and secondary reactors were 1.4 hrs and 1 hr, respectively. A sample was taken from the second reactor when steady-state condition was attained. A small amount of the sample was injected in a gas chromatograph (GC) to determine the yield. The remainder of the sample was distilled to remove any unreacted monomers and dimers. The bottoms stream was hydrogenated to saturate the trimer, and higher, oligomers. The hydrogenated products generally had a nominal viscosity at 100° C. of 5 cSt. A sample of the hydrogenated product was distilled to obtain a bottoms product with a nominal 100° C. viscosity of 6 cSt. The overheads product was blended with some of the 5 cSt PAO to make a product with a nominal 100° C. viscosity of 4 cSt. The yield was determined from the GC results (% $C_{26}$ and above), The feedstock blends used, the weight percent of the different PAO's, the average carbon value for the feedstock, and the yields are set forth in Table 1 below.

TABLE 1

| Example No. | C8, wt % | C10, wt % | C12, wt % | C average | % Yield | 4cSt/6cSt Split wt/wt |
| --- | --- | --- | --- | --- | --- | --- |
| Reference | 0 | 55 | 45 | 10.9 | 87.4 | 40/60 |
| 1 | 35 | 35 | 30 | 9.9 | 80.4 | 50/50 |
| 2 | 30 | 40 | 30 | 10 | 85.8 | 55/45 |
| 3 | 30 | 30 | 40 | 10.2 | 81.1 | 55/45 |

TABLE 1-continued

| Example No. | C8, wt % | C10, wt % | C12, wt % | C average | % Yield | 4cSt/6cSt Split wt/wt |
|---|---|---|---|---|---|---|
| 4 | 30 | 20 | 50 | 10.4 | 81.8 | 47/53 |
| 5 | 25 | 35 | 40 | 10.3 | 83.8 | 53/47 |
| 6 | 20 | 45 | 35 | 10.3 | 81.3 | 55/45 |
| 7 | 10 | 60 | 30 | 10.4 | 87.6 | 58/42 |

The reference feedstock is a conventional feedstock blend used to manufacture commercial PAOs; the reference feedstock is oligomerized in the same manner as the exemplary feedstocks. One goal of the present invention is to vary the feedstock blend while maintaining or improving the physical properties of the low viscosity PAOs, making such PAOs more suitable for high demand operating conditions.

The properties of the resulting nominal 100° C. 4 cSt PAO are set forth in Table 2 below.

TABLE 2

Properties of 4cSt PAO

| Example No. | 100° C. Vis. CSt | −40° C. Vis cSt | Noack Vol. wt % | Pour Point ° C. |
|---|---|---|---|---|
| Reference | 4.09 | 2753 | 11.1 | −60 |
| 1 | 4.10 | 2965 | 14.4 | −66 |
| 2 | 4.10 | 2927 | 14.4 | −66 |
| 3 | 4.11 | 2884 | 13.6 | −66 |
| 4 | 4.10 | 2875 | 13.0 | −60 |
| 5 | 4.10 | 2816 | 13.5 | −63 |
| 6 | 4.09 | 2812 | 13.4 | −63 |
| 7 | 4.09 | 2727 | 13.3 | −63 |

The properties of the resulting nominal 100° C. 6 cSt PAO are set forth in Table 3 below.

TABLE 3

Properties of 6 cSt PAO

| Example No. | 100° C. Vis. CSt | −40° C. Vis cSt | Noack Vol. wt % | Pour Point ° C. |
|---|---|---|---|---|
| Reference | 5.92 | 7367 | 5.2 | −54 |
| 1 | 5.88 | 8181 | 6.4 | −60 |
| 2 | 5.87 | 8166 | 6.2 | −60 |
| 3 | 5.88 | 7672 | 5.9 | −57 |
| 4 | 5.89 | 7749 | 5.3 | −56 |
| 5 | 5.90 | 7912 | 5.8 | −57 |
| 6 | 5.90 | 7996 | 5.9 | −57 |
| 7 | 5.87 | 7672 | 5.7 | −57 |

For Example 1, with the addition of octene to the feedstock, the 4 cSt/6 cSt PAO split yielded a higher amount of 4 cSt PAO in comparison to the Reference feedstock. The pour points of both the 4 cSt and the 6 cSt PAO products are reduced, improving the pour point characteristics. These improvements are an offset to the increase in Noack volatility of both products; though for both PAOs, the Noack volatility values are acceptable.

For Example 2, the octene feed is reduced in comparison to Example 1, with an offsetting increase to the decene amount. Both the percentage yield and the amount of 4 cSt PAO are increased over both Example 1 and the Reference feedstock. As shown in Tables 2 and 3, the product properties are similar to those of Example 1.

For Example 3, in comparison to Example 1, the octene and decene amounts are reduced by 5% each, with a corresponding 10% increase in dodecene. The percentage yield is reduced; however, the spilt of 4 cSt PAO is above 50%. The 4 cSt PAO has an improved pour point over the reference PAO, and the −40° C. viscosity and the Noack volatility are slightly better than those in Example 2. The 6 cSt PAO has an improved −40° C. viscosity over Examples 1 and 2, and an improved pour point value.

Example 4 has the lowest amount of decene of the prepared examples, and the highest amount of dodecene. The yield is comparable to that of Example 3 and the product split is better than the Reference but lower than those of Examples 1, 2 and 3. In addition, the pour points of both products, even though acceptable, are inferior to those of Examples 1, 2 and 3. However, the −40° C. viscosity and the Noack volatility of both 4 cSt and 6 cSt PAO products are either better or comparable to those of Example 3.

Similar to Example 1, Example 5 has a reduced octene amount with a corresponding increase in dodecene. The properties of both PAO products are similar to those of Example 4 but the product split is higher than that of Example 4. The product properties, yield, as well as the product split are all within the desired ranges.

For the feed blend of Example 6, with an increase in the decene amount, the PAO product properties similar to those in Example 5 but has a higher product split.

Of the exemplary feedstocks oligomerized, Example 7 has the least amount of octene in the feedstock. This feed blend yields a good balance between yield, product split and product properties.

Based on the above data, it can be seen that with increased octene in the feed blend, the general tendency of the Noack volatility increases, as does the −40° C. viscosity. However, the pour point decreases with increased octene content. This holds for both low viscosity PAO's discussed and sampled herein. This suggests there is a preferred maximum amount of octene for the feedstock to yield a high performance low viscosity PAO.

In studying the impact of the decene percentage in the feedstock, the following theories can be put forth. For the nominal 4 cSt PAO, as the decene amount in the feedstock increases, the Noack volatility increases, with higher Noack volatility values observed for feedstocks with a greater amount of octene. Also, for the nominal 4 cSt PAOs, the pour point decreases with greater decene amounts, with a lower point observed with feedstock comprising a higher amount of octene.

In studying the impact of the dodecene amount in the feedstock, for the nominal 4 cSt PAO, a large dodecene amount appears to decrease the Noack volatility value, however, the pour point increases, and the yield percentage of the desired 4 cSt PAO decreases. This suggests that for the production of a high performance nominal 4 cSt PAO, there is a preferred maximum amount of dodecene in the feedstock.

When studying the impact of the average carbon content value for the tri-blend in the feedstock, calculated as the weighed average of the $C_8$, $C_{10}$, and $C_{12}$ in the feedstock, pour points are lower for lower average carbon content feedstocks, while the Noack volatility values decrease with a higher average carbon content feedstock. In blending feedstock with a mixture of octene, decene, and dodecene, to achieve the average carbon content of the tri-blend in the feedstock should be in the range of 9.9 to 10.5; preferably in the range of 9.9 to 10.4, even more preferably in the range of 10.2 to 10.3.

The PAO's produced as taught herein are useful herein by themselves as lubricants or functional fluids, or they may be mixed with various conventional additives. They may also be blended with other basestocks, such as American Petroleum Institute (API) Groups I to III and V, or other conventional PAOs (API Group IV), and also other hydrocarbon fluids, e.g., isoparaffins, normal paraffins, and the like. When formulating lubricants with the PAO's, the PAO's, other basestocks, and other hydrocarbon fluids may form a major or minor portion of the overall lubricant composition and the choice thereof and quantity, as well as any additional additives, can be tailored to meet desired end-use criteria.

What is claimed is:

1. A process for the oligomerization of alpha-olefins, the process comprising;
   a) contacting a feedstock of alpha-olefins and at least one oligomerization catalyst in a reactor under oligomerization conditions to oligomerize the alpha-olefins, the feedstock of alpha-olefins being a blend of decene, the decene being present in amounts of 25 to 35 weight % decene, at least 10 weight % octene, and at least 30 weight % dodecene, wherein the weight percentages of the octene, decene, and dodecene in the feedstock yield an average carbon content in the range of 9.9 to 10.5;
   b) removing unreacted alpha-olefins and dimers of the alpha-olefins to obtain a bottoms intermediate comprising trimers;
   c) hydrogenating the bottoms product to obtain a hydrogenated product; and
   d) separating the hydrogenated product to obtain at least two fractions of polyalpha-olefins of differing nominal viscosities.

2. The process of claim 1, wherein the feed comprises not more than about 35 weight % octene.

3. The process of claim 1, wherein the feed comprises not more than about 45 weight % dodecene.

4. The process of claim 1, wherein the feed comprises not more than about 35 weight % octene, not more than 45 weight % dodecene, and 25 weight % to 35 weight % decene.

5. The process of claim 1, wherein the separation of step d) yields a fraction of polyalpha-olefin having a 100° C. viscosity of about 4 cSt and a fraction having a 100° C. viscosity of about 6 cSt, the fraction of about 4 cSt viscosity at 100° C. being at least 50% of the yield.

6. The process of claim 5, wherein the polyalpha-olefin having a viscosity of about 4 cSt at 100° C. has a pour point of about −45° C. to −80° C.; the pour point being determined by ASTM D5950.

7. The process of claim 5, wherein the polyalpha-olefin having a viscosity of about 6 cSt at 100° C. has a pour point of about −45° C. to −75° C.; the pour point being determined by ASTM D5950.

8. The process of claim 1, wherein the weight percentages of the octene, decene, and dodecene in the feedstock yield an average carbon content in the range of 9.9 to 10.4.

9. The process of claim 1, wherein the weight percentages of the octene, decene, and dodecene in the feedstock yield an average carbon content in the range of 10.2 to 10.3.

* * * * *